US007290101B1

United States Patent
Kekre et al.

(10) Patent No.: US 7,290,101 B1
(45) Date of Patent: Oct. 30, 2007

(54) USING DATA COPIES FOR REDUNDANCY

(75) Inventors: Anand A. Kekre, Pune (IN); Ankur P. Panchbudhe, Nagpur (IN)

(73) Assignee: Symantec Corporation, Cupertino, CA (US)

( * ) Notice: Subject to any disclaimer, the term of this patent is extended or adjusted under 35 U.S.C. 154(b) by 469 days.

(21) Appl. No.: 10/741,858

(22) Filed: Dec. 19, 2003

(51) Int. Cl.
*G06F 12/00* (2006.01)
*G06F 13/00* (2006.01)
*G06F 15/80* (2006.01)

(52) U.S. Cl. .................. 711/162; 711/114; 711/154; 709/216

(58) Field of Classification Search ................ None
See application file for complete search history.

(56) References Cited

U.S. PATENT DOCUMENTS

| | | | | |
|---|---|---|---|---|
| 6,061,770 | A |  | 5/2000 | Franklin ................. 711/162 |
| 6,085,298 | A |  | 7/2000 | Ohran .................... 711/162 |
| 6,611,901 | B1 | * | 8/2003 | Micka et al. ............ 711/162 |
| 6,618,794 | B1 | * | 9/2003 | Sicola et al. ............ 711/154 |
| 6,880,053 | B2 | * | 4/2005 | Kiselev et al. .......... 711/162 |
| 6,912,631 | B1 | * | 6/2005 | Kekre et al. ............ 711/162 |
| 6,938,135 | B1 | * | 8/2005 | Kekre et al. ............ 711/162 |
| 2004/0123031 | A1 | * | 6/2004 | Kiselev et al. .......... 711/114 |
| 2005/0004979 | A1 | * | 1/2005 | Berkowitz et al. ...... 709/203 |
| 2005/0169064 | A1 | * | 8/2005 | Kiselev et al. ..... 365/189.05 |

* cited by examiner

Primary Examiner—Hyung Sough
Assistant Examiner—Mardochee Chery
(74) Attorney, Agent, or Firm—Campbell Stephenson LLP

(57) ABSTRACT

An apparatus and method implemented by a computer system of using data copies of a volume for redundancy when data of the volume is rendered corrupted or inaccessible. In one embodiment of the method a data volume is created. The data volume comprises a plurality of data blocks including a first data block. After creation of the data volume, a point-in-time (PIT) copy or a replica copy of the data volume is created, and a redirection map is created. The redirection map comprises a plurality of entries, wherein each entry of the map indicates whether memories allocated to store data of respective data blocks of the data volume and the PIT copy or the replica copy, contain identical data. Data of the data volume may become corrupt or inaccessible after creation of the PIT copy or replica copy. For example, suppose an I/O transaction is generated to read data from or write data to memory allocated to store data of the first data block of the data volume, and it is discovered that the memory allocated to store data of the first data block is inaccessible as a result of physical damage to this memory. The redirection map and the PIT copy or replica copy can be used to overcome inaccessibility of memory allocated to the first block. If an entry in the redirection map indicates that identical data is stored in memories allocated to the first data block of the data volume and the first data block of the PIT copy (or replica copy), respectively, data is read from memory allocated to store data of a first block of the PIT copy or the replica copy, and possibly stored in new memory allocated to store data of the first data block of the data volume.

21 Claims, 7 Drawing Sheets

USING DATA COPIES FOR REDUNDANCY

BACKGROUND OF THE INVENTION

Many businesses use redundant copies to enable fast recovery from loss of data. Still other businesses create a point-in-time (PIT) copy of critical data to guard against corruption or inaccessibility of the critical data. Methods for creating PIT copies are well known in the art. One method involves copying data to a magnetic data storage tape via a tape drive using well known backup data storage systems. Other methods of creating a PIT copy involve copying data to a hard disk. Creating a PIT copy on hard disk is preferable to creating a PIT copy on a magnetic data storage tape since data is more quickly read from a hard disk than from to a magnetic data storage tape.

FIG. 1 illustrates relevant components of an exemplary data processing system 10 that creates a PIT copy. More particularly, FIG. 1 shows data processing system 10 having a primary node (e.g., a server computer system) 12 coupled to data storage systems 14 and 16 via data link 18. Data storage systems 14 and 16 include memories 20 and 22, respectively. Each of memories 20 and 22 includes a plurality of hard disks for storing data, it being understood that the term "memory" should not be limited thereto. The hard disks of memory 20 store a data volume V, while the hard disks of memory 22 store a PIT copy of volume V. Primary node 12 can access data in either data volume V or its PIT copy using input/output (IO) transactions transmitted via data link 18.

Primary node 12 may include a data storage management system (not shown) that takes form in software instructions executing on one or more processors (not shown). The data management system includes, in one embodiment, a file system, a system for creating data volumes, and a system for managing the distribution of data of a volume across one or more memory devices. FIG. 2 shows (in block diagram form) data volume V and its PIT copy. Data volume V and its PIT copy are shown having $n_{max}$ blocks of data. Data of each block is stored in one or more hard disks allocated thereto. Corresponding data blocks in volume V and its PIT copy are equal in size. Thus, data block 1 of volume V can be equal in size to that of data block 1 of the PIT copy. Each of the data blocks in volume V may be equal in size to each other. Alternatively, the data blocks in volume V may vary in size.

As noted above, primary node 12 creates the PIT backup copy of volume V to guard against data corruption or data inaccessibility. When the PIT copy is first created, the hard disks allocated to store the PIT copy may contain no data. Creating a PIT backup copy of volume V is a procedure well known in the art. In essence, the procedure includes primary node 12 copying data from memory allocated to each data block of volume V to memory allocated to store data of a corresponding block of the PIT copy in a block by block process until the entire data content of volume V is copied to the PIT copy. After the PIT copy is created, primary node 12 logs each IO transaction that modifies data of volume V.

Subsequent to the creation of the PIT copy, data within the volume V may become inadvertently corrupted as a result of erroneous software and/or hardware behavior. Moreover, data within volume V may become inaccessible as a result of software and/or hardware failure. Primary node 12 can use the PIT copy to correct corrupted or inaccessible data in volume V. The process for correcting corrupted or inaccessible data, however, can be lengthy. To illustrate, suppose the hard disk memory space allocated to store data of block 2 of volume V becomes inaccessible as a result of hardware failure sometime after creation of the PIT copy. If primary node 12 attempts to access data of block 2, data storage system 14 will generate an IO error. When the error is generated, primary node 12 might create a third volume (designated R in FIG. 2) using unused hard disk memory spaces, copy the data contents of the PIT copy to volume R in a block by block fashion, and modify the contents of volume R according to the transactions logged by the primary node. When this process is complete, volume R should be identical in data content to the volume V, and this means that the memory allocated to block 2 in volume V should contain data identical to data contained in memory allocated to block 2 of volume R. Memory allocated to block 2 in volume R, however, is data accessible. Primary node may then allocate new (and accessible) memory space to block 2 of volume V. Once the new memory is allocated, primary node 12 copies data from memory allocated to block 2 of volume R to the newly allocated memory for block 2 of volume V. After copying data to the newly allocated memory, primary node 12 can access block 2 data using an IO transaction.

SUMMARY OF THE INVENTION

An apparatus and method implemented by a computer system of using data copies of a volume for redundancy when data of the volume is rendered corrupted or inaccessible. In one embodiment of the method a data volume is created. The data volume comprises a plurality of data blocks including a first data block. After creation of the data volume, a point-in-time (PIT) copy of the data volume is created, and a redirection map is created. The redirection map comprises a plurality of entries, wherein each entry of the map indicates whether memories allocated to store data of respective data blocks of the data volume and the PIT copy, contain identical data. Data of the data volume may become corrupt or inaccessible after creation of the PIT copy. For example, suppose an I/O transaction is generated to read data from or write data to memory allocated to store data of the first data block of the data volume, and it is discovered that the memory allocated to store data of the first data block is inaccessible as a result of physical damage to this memory. The redirection map and the PIT copy can be used to overcome inaccessibility of memory allocated to the first block. If an entry in the redirection map indicates that identical data is stored in memories allocated to the first data block of the data volume and the first data block of the PIT copy, respectively, data is read from memory allocated to store data of a first block of the PIT copy, and possibly stored in new memory allocated to store data of the first data block of the data volume.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

The present invention relates to the method or apparatus for using a data copy (e.g., a PIT copy of a volume V or a replica R of a volume V) for quickly and efficiently responding to an IO error caused by, for example, data corruption or data inaccessibility. In one embodiment, the method may be implemented by a computer system executing instructions stored on a computer readable medium.

Figure 1:
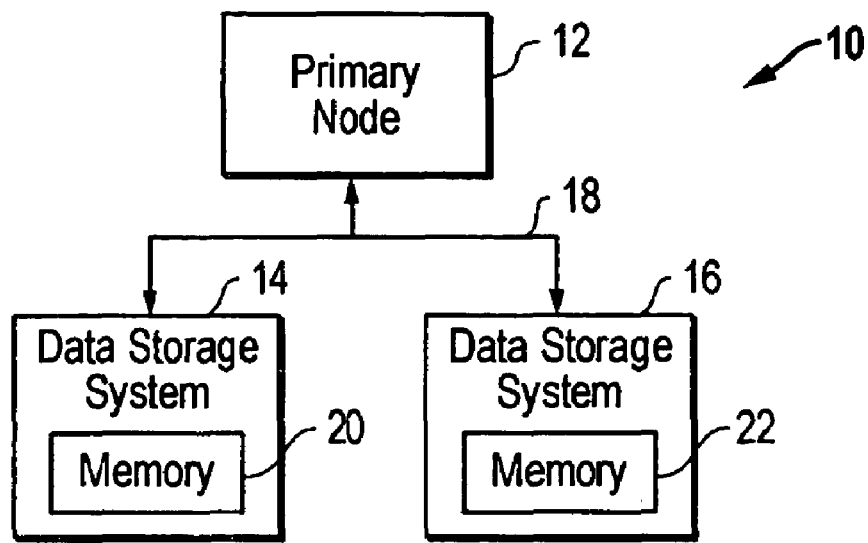
FIG. 1 is a block diagram of a data processing system.
Figure 2:
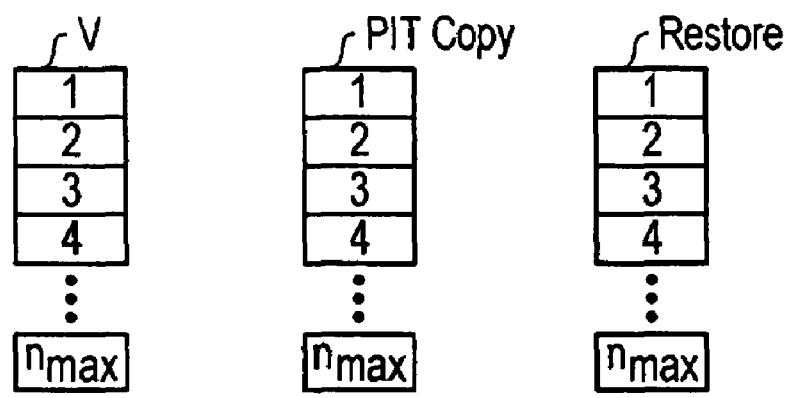
FIG. 2 shows block diagrams representing data structures stored in the data storage systems shown in FIG. 1.
Figure 3:
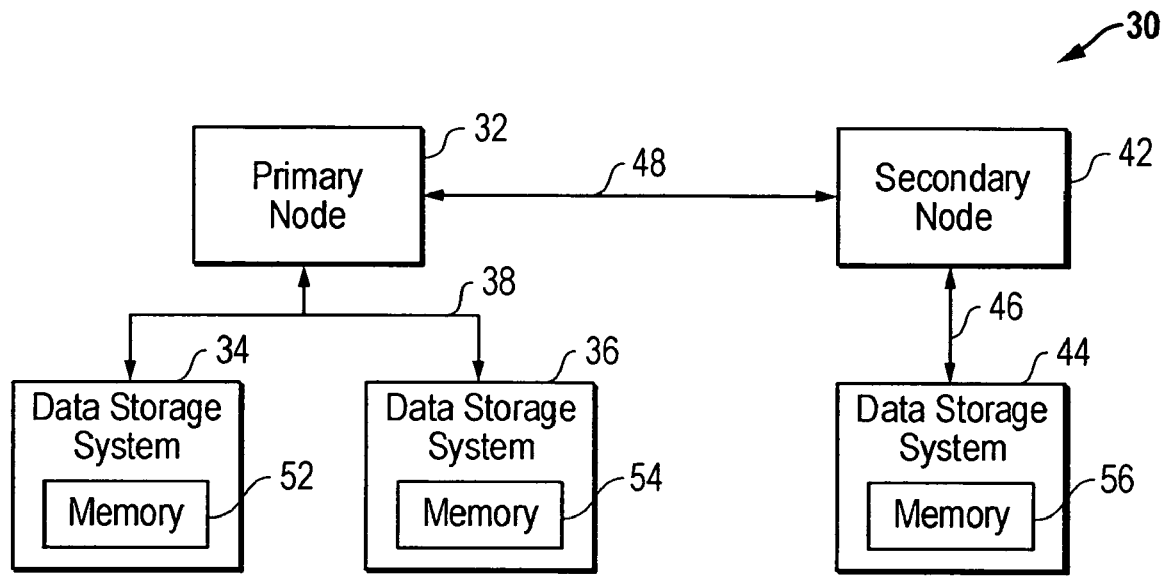
FIG. 3 is a block diagram of a data processing system employing an embodiment of the present invention.

FIG. 3 is a block diagram of a data processing system 30 employing one embodiment of the present invention, it being understood that the present invention should not be limited to use in a data processing system such as that shown in FIG. 3. System 30 includes a primary node 32 coupled to data storage systems 34 and 36 via data link 38. The term "coupled" should not be limited to a direct connection between two components such as primary node 32 and data storage system 34 shown in FIG. 3. The term "coupled" is also meant to include an indirect connection between two components. For example, primary node 32 could be coupled to data storage system 34 via a SAN switch (not shown). System 30 also includes a secondary node 42 coupled to data storage system 44 via data link 46. Primary node 32 and secondary node 42 are coupled together via a communication link (e.g., the Internet) 48.

Data storage systems 34, 36, and 44 include memory systems (memories) 52, 54, and 56, respectively. Each of these memories may take form in one or more dynamic or static random access memories, one or more arrays of magnetic or optical hard disks, or combinations thereof. The term "memory" should not be limited to the foregoing hardware components; rather, memories 52-56 may take form in any hardware, software, or combination of hardware and software in which data may be persistently stored and accessed. The data memories may take form in complex construction of several hardware components operating under the direction of software. For purposes of explanation only, each of memories 52-56 will be described as containing multiple hard disks for storing data.

For ease of illustration, data memory 52 stores a data volume V, memory 54 stores a PIT copy of volume V, and memory 56 stores a replica R of volume V. It is noted that volume V may be stored in distributed fashion across memory 52 and 54, and that the PIT copy may be stored in distributed fashion across memory 52 and 54. Replica R is a real or near real time copy of volume V maintained using a synchronous, asynchronous, or periodic replication technique. Primary node 32 can access data volume V or the PIT copy by generating and sending IO transactions to data storage systems 34 and 36 in response to receiving requests from client computer system (not shown) coupled to 32. Secondary node 42 and data storage system 44 are provided to protect against catastrophic failure of primary node 32 and/or data storage systems 34 and 36. To illustrate, if primary node 32 fails as a result of hardware or software error, requests to read or write data from client computer systems can be redirected from primary node 32 to secondary node 42. Secondary node 42 can respond to the requests to read or write data using the replica R contained within memory 56.

Figure 4:
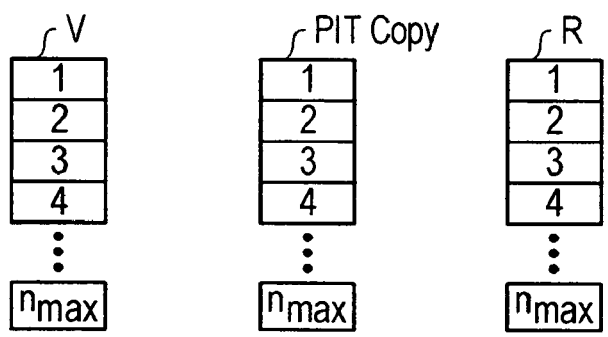
FIG. 4 shows block diagrams representing data structures stored in the data storage systems shown in FIG. 3.

Primary node 32 may include a memory for storing instructions that, when executed by primary node 32, implements one embodiment of the present invention. Primary node 12 may also include a data management system (not shown) that takes form in software instructions executing on one or more processes (not shown). The data management system includes, in one embodiment, a file system, a system for creating a data volume, and a system for managing the distribution of data of volume V and its PIT copy across one or more hard disks. Volume Manager™ provided by VERITAS Software Corporation of Mountain View, Calif., is an exemplary system for managing the distribution of volume data across multiple hard disks. FIG. 4 represents in block diagram form, volume V and its PIT copy. Volume V and its PIT copy each includes $n_{max}$ data blocks. Data in each block is stored in physical memory of one or more hard disks allocated thereto. These physical memory allocated to a data block need not be contiguous to each other on a single hard disk. FIG. 4 also shows replica R consisting of $n_{max}$ data blocks. Physical memory of hard disks in memory 56 are allocated to store data for each data block n of replica R.

Corresponding data blocks in volume V, the PIT copy and replica R can be equal in size. Thus, data block 1 volume V is equal in size to data block 1 of the PIT copy and replica R. Each of the data blocks in volume V may be equal in size to each other. Alternatively, data blocks volume V may vary in size.

Volume V is the working volume of data processing system 30. In other words, primary node 32 reads or writes data to volume V using IO transactions in response to receiving requests from client computer systems coupled thereto. The PIT copy of volume V may be real or virtual. In one embodiment, primary node 32 creates a virtual PIT copy using the methods described in U.S. Pat. No. 6,785,789, entitled "Method and Apparatus for Creating a Virtual Data Copy," which is incorporated herein by reference in its entirety. A virtual PIT copy can be transformed into a real PIT copy using a background copying process described in the aforementioned patent application. The PIT copy may be initially created as real. For example, before primary node 32 modifies data in volume V, primary node 32 copies data from volume V to the PIT copy in a block by block fashion until respective blocks within volume V and the PIT copy contain identical data. A real PIT copy may also be created by "breaking off" a mirrored copy of volume V. A mirrored copy is a real or near real time copy of volume V. A mirrored copy closely tracks changes to the volume V. When primary node 32 writes new data to volume V, the new data is also written to the mirrored copy. A write to volume V is not considered complete until the data is also written to the mirrored copy. When a mirror is broken off, to create a real PIT copy, the mirror no longer tracks changes to volume V.

Thus, after the mirrored volume is broken off, primary node 32 writes new data only to volume V.

Figure 5:
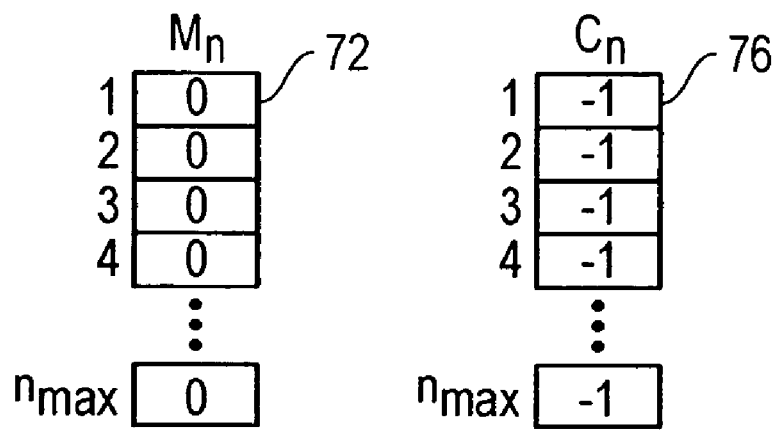
FIG. 5 shows block diagrams of redirection maps used in the data processing system of FIG. 3.

Data within volume V is subject to corruption or inaccessibility. For example, primary node 32 may generate and send to data storage system 34 an IO transaction to read data from or write data to block 2 of volume V. As a result of the physical failure of the hard disk allocated to store data of block 2, data storage system 34 will generate an error message indicating that the data sought cannot be accessed. Rather than performing the lengthy and process intensive correction process described within the background section above, primary node 32 may recover from the error message by using a process which involves only data contained in block 2 of the PIT copy or block 2 of replica R. In one embodiment, this process may use a redirection map such as redirection map 72 or 76 shown in FIG. 5. The redirection maps shown in FIG. 5 include $n_{max}$ entries corresponding to the $n_{max}$ data blocks of volume V. Each of the entries within redirection map 72 consists of a single bit designated $M_n$ while each entry of redirection map 76 consists of a counter designated $C_n$. Each entry $M_n$ in redirection map 72 is set to logical 0 or logical 1 depending upon whether memories that store data of respective data blocks of volume V and the PIT copy, contain identical data. Thus, if memory allocated to block 3 of volume V contains data identical to that stored in memory allocated to block 3 of the PIT copy, $M_n$ is set to logical 1, and if memory allocated to block 3 of volume V does not contain data identical to that stored in memory allocated to block 3 of the PIT copy, $M_n$ is set to logical 0. FIG. 5 shows redirection map 72 with each entry $M_n$ set to logical 0. The redirection map 72 may be created when the PIT copy is first created. If the PIT copy is initially created as a virtual volume, then M, in each entry of redirection map 72 is set to logical 0 since no memory allocated to store data of a virtual PIT copy initially stores data. If, however, the PIT copy within logical memory 64 is created initially as real (e.g., a mirror break-off), each entry within redirection map 72 is initially set to logical 1, thus indicating that at the time of creation, memory allocated to store data of the PIT copy data blocks contain identical data to that stored in memory allocated to blocks of the volume V. Subsequent to creation of the PIT copy and redirection map 72, primary node may modify contents of block n of the volume V or its PIT copy. If primary node 32 modifies data of block n of volume V or its PIT copy such that block n volume V or its PIT copy no longer contain identical data, primary node 32 sets $M_n$ within redirection map 72 to logical 0. In this fashion, redirection map 72 identifies respective blocks in volume V and its PIT copy, which contain identical data.

Redirection map 76 is also used to determine whether respective blocks within two volumes contain identical data. Redirection map 76 is used to determine whether respective blocks n of volume V and replica R contain identical data where replica R is maintained using asynchronous replication. Because replica R is maintained using asynchronous replication, a data block n of replica R may be out of sync with corresponding block n of volume V by more than one write data transaction. As such, a single bit redirection map is insufficient to determine whether corresponding blocks n within volume V and replica R are synchronized or contain identical data. Redirection map 76 uses counters $C_n$ to determine synchronization between corresponding blocks n of volume V and replica R. When replica R is first initialized, memory allocated to blocks 1-$n_{max}$ of replica R store no data, and counters $C_n$ are set to −1 before the process to synchronize volume V and replica R begins. When corresponding memory blocks n are synchronized, counter $C_n$ is set to 0 thus indicating that memory allocated to blocks n of volume V and replica R contain identical data. When full synchronization is complete between data volume V and replica R, all counters $C_n$ are set to 0. Whenever primary node 32 writes new data to block n in volume V, primary node 32 increments $C_n$ by 1. Primary node 32 subsequently decrements $C_n$ by 1 when block n within replica R is updated with the new data and primary node 32 receives an acknowledgment from secondary node 42 that block n of replica R has been modified accordingly.

FIGS. 7-10 illustrate relevant operational aspects of using the PIT copy or the replica R as redundant copies to correct data corruption or inaccessibility in volume V. The processes described in FIGS. 7-10 make use of the redirection maps 72 or 76 in FIG. 5. The process described within FIGS. 7-10 may be similar, but not identical to processes using a redundant mirror to overcome an instance in which data of volume V is corrupted or inaccessible. In one sense, the processes shown in FIGS. 7-10 presume the existence of a pseudo-mirror.

Figure 7:
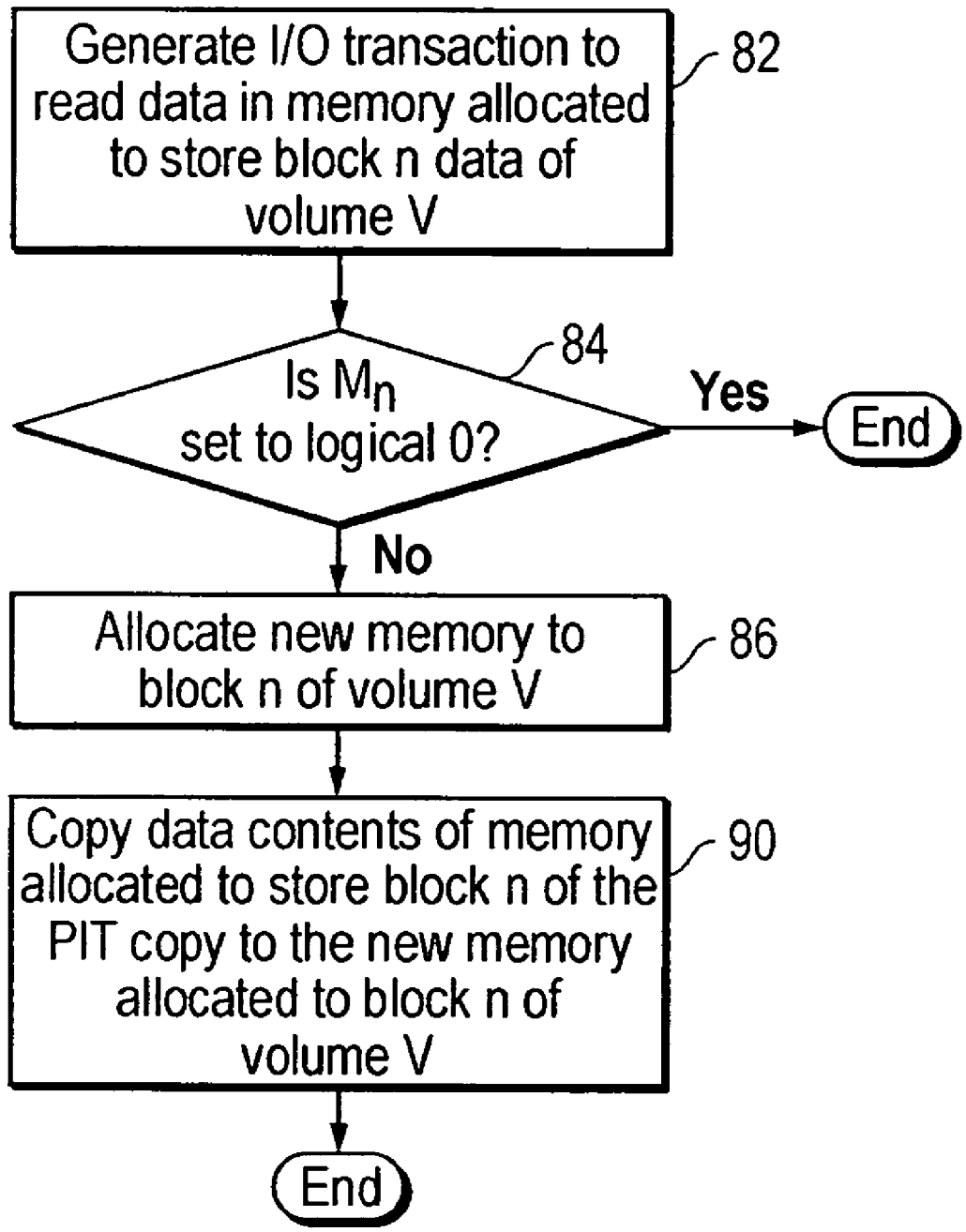
FIG. 7 illustrates relevant operational aspects of using a PIT copy to correct data corruption or inaccessibility in a volume V during an IO transaction to read data.

The process shown in FIG. 7 illustrates relevant aspects of using the PIT to recover from a data corruption or data inaccessibility error that results from an attempt to read data from volume V. More particularly, the process shown in FIG. 7 begins when primary node 32 generates an IO transaction to read data of block n of volume V. For purposes of explanation, it will be presumed that the hard drive memory space allocated to store data of block n, is inaccessible as a result of some hardware failure. As a result of the inaccessibility, data storage system 34 may generate an error message in response to receiving the IO transaction generated in 82. In response to receiving the error message, primary node 32 accesses redirection map 72 and determines the state of $M_n$ therein as shown in step 84. If $M_n$ is set to logical 0 in step 84, the data contents of block n of volume V and its PIT copy are presumed different, and the process ends in FIG. 7. If $M_n$ is set to logical 0, primary node 32 may have to use the traditional process described within the background section above to overcome the inability to access data in block n of volume V. However, if $M_n$ is set to logical 1 in step 84, the process proceeds to step 86 where new memory is allocated to block n of volume V. It is presumed that the new memory is unused and functioning (i.e., capable of being accessed). Thereafter, primary node 32 copies the data stored in memory allocated to block n of the PIT copy to the newly allocated memory as shown in step 90. Once step 90 is performed, IO transactions to read data from block n of volume V can complete without having to go through the lengthy process described in the background section above. It is noted that if block n of data volume V initially contains corrupted data, block n can be corrected using the process shown in FIG. 7 without the allocation step 86, and with step 90 reduced to overwriting data stored in memory allocated to block n of volume V with data stored in memory allocated to block n of the PIT copy.

Figure 8:
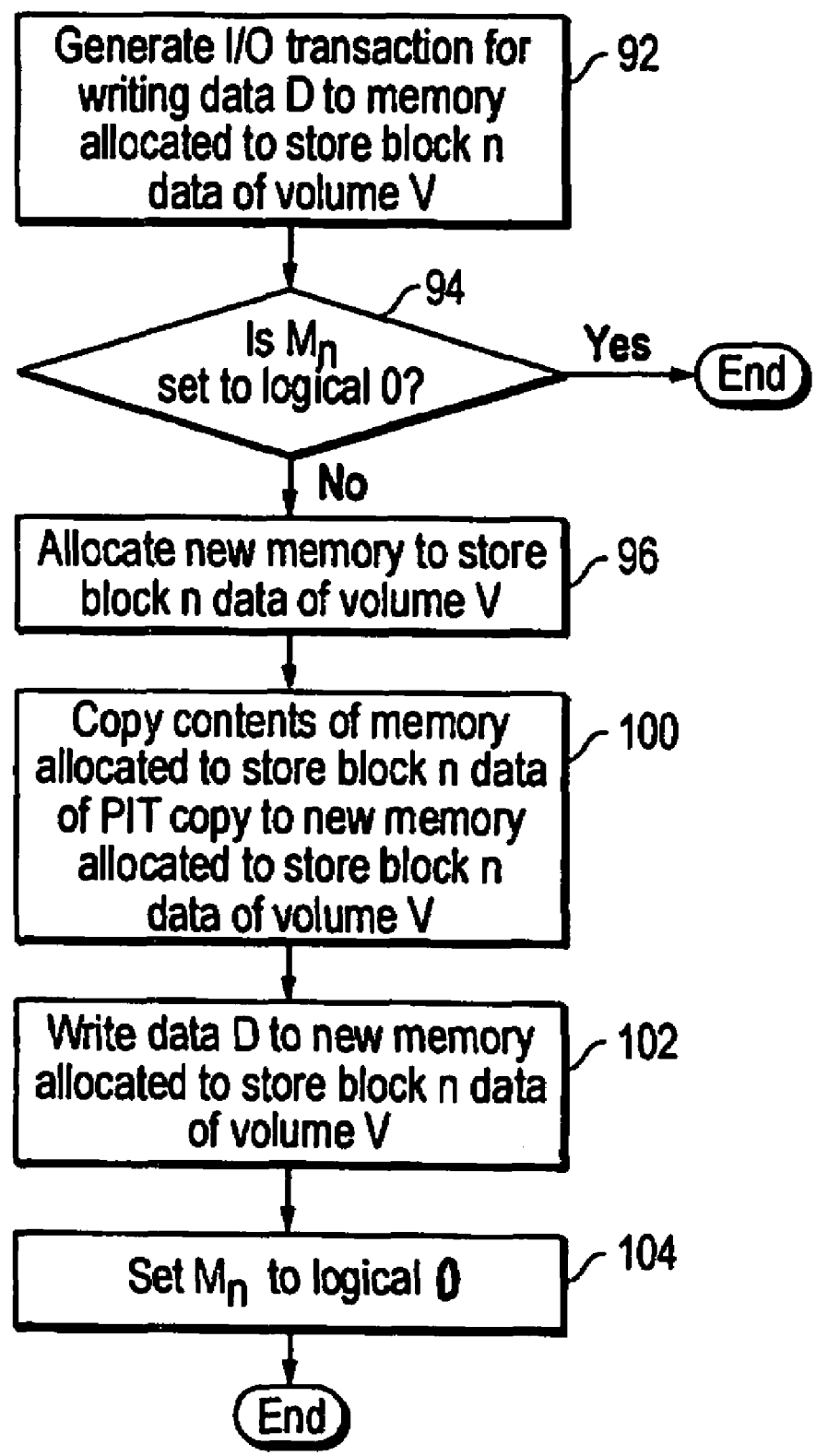
FIG. 8 illustrates relevant operational aspects of using a PIT copy to correct data corruption or inaccessibility in a volume V during an IO transaction to write data.

FIG. 8 illustrates relevant operational aspects employed when attempting to write to block n of volume V when, for example, the memory allocated to block n is inaccessible as a result of hardware failure. More particularly, FIG. 8 begins with step 92 when primary node 32 generates an IO transaction to write data D to block n of volume V. It is presumed that the physical memory space allocated to block n is inaccessible as a result of hardware and/or software failure. As a result, data storage system 52 will generate an error message. In response, primary node 32 will access redirection map 32 to determine the state of $M_n$. If $M_n$ is set logical 0, the process ends and primary node 32 may be required to employ the process described in the background section above to overcome the failure of the physical memory allocated to store block n data. If, however, $M_n$ set to logical 1 in step 94, primary node 32 allocates new memory to store block n data of volume V as shown in step 96. In step 100, primary node 32 copies data stored in memory allocated to block n of the PIT copy to the newly allocated memory to store block n of the volume V. Thereafter, data D is written to the newly allocated memory in accordance with the IO transaction of step 92, and in step 104, primary node 32 sets $M_n$ to logical 0 thus indicating that the memories currently allocated to respective blocks n of data volume V and its PIT copy, no longer store identical data.

Figure 6:
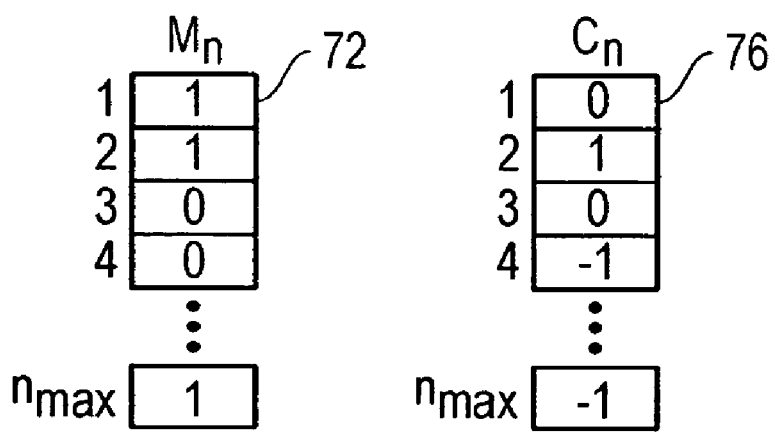
FIG. 6 shows the redirection maps of FIG. 5 after modification by the primary node of FIG. 3.

FIG. 6 illustrates redirection map 72 shown in FIG. 5 after modification by primary node 32 to account for the modification of data block 3 of volume V in accordance to the process shown in FIG. 8. It is presumed within FIG. 5 that initially, all bits within redirection map 72 were set to logical 1. It is noted that primary node 32 may alter entries in the redirection map in response to modifying data in the PIT copy. For example, after creation of redirection map 72, primary node 32 modifies data in block 4 of the PIT copy. In response, primary node clears entry 4 of the redirection map 72 to indicate that the contents of blocks 4 in the volume V and its PIT copy are no longer identical. FIG. 6 Illustrates the result of clearing entry 4 in redirection map 72 to account for differences in blocks 4 of volume V and its PIT copy.

Figure 9:
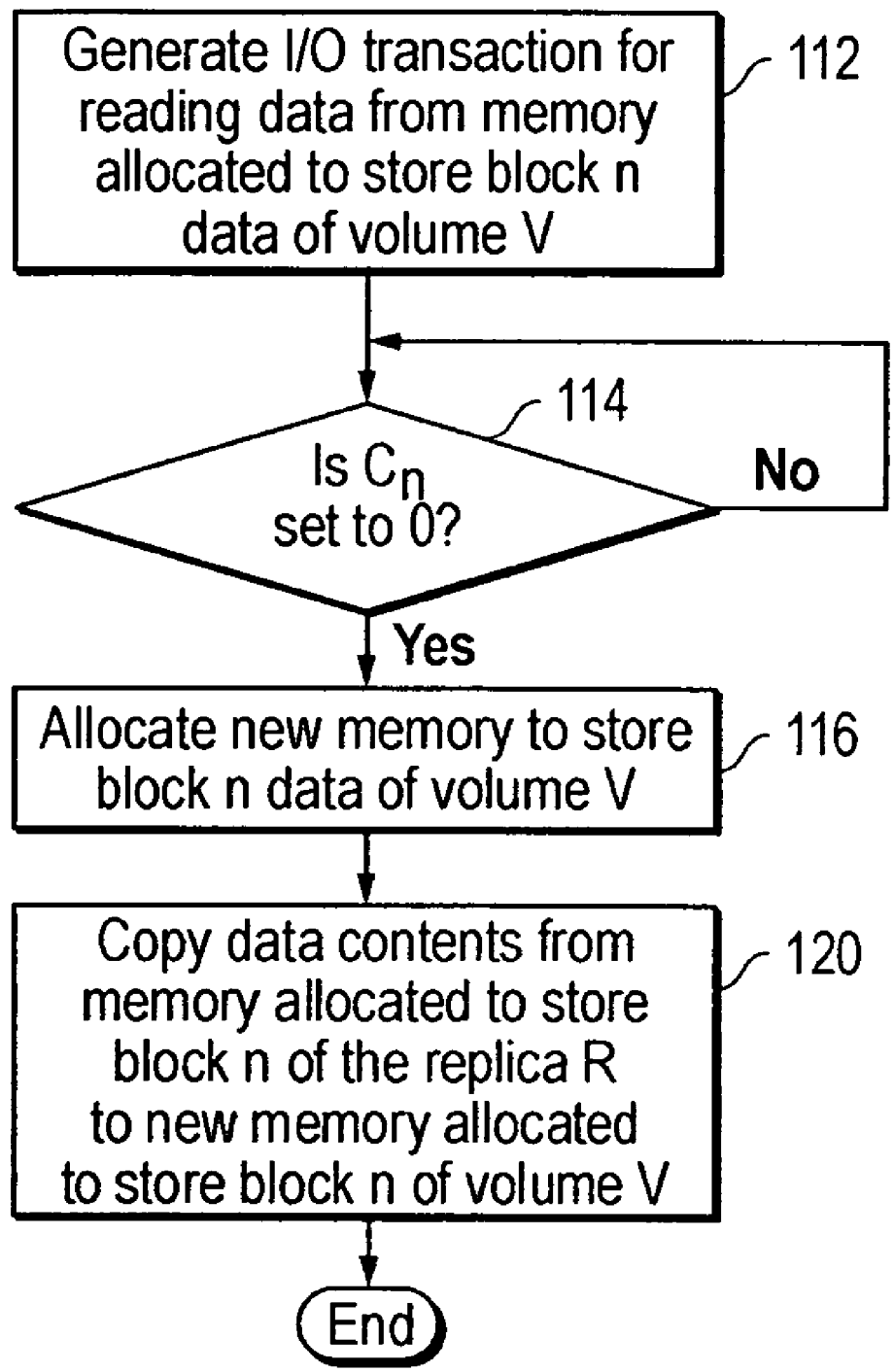
FIG. 9 illustrates relevant operational aspects of using a replica R to correct data corruption or inaccessibility in a volume V during an IO transaction to read data.

As noted above, replica R may be employed to correct an instance of data corruption or data inaccessibility of data within volume V. FIG. 9 illustrates relevant aspects of using replica R to recover from a data corruption or data inaccessibility error that results from an attempt to read data from volume V. The process shown in FIG. 9 begins with step 112 when primary node 32 generates an IO transaction for reading data from memory allocated to store block n data of volume V. Again, it is presumed that the memory allocated to block n of volume V is inaccessible as a result of hardware failure even though other memories allocated to store volume V data are accessible. In response to data inaccessibility, data system 14 generates an error message (not shown), and the process proceeds to step 114 where primary node 32 determines the counter value of $C_n$ in redirection map 76. If the counter $C_n$ is set to −1 or to a value greater than 0, then data in the memories are allocated to blocks n of volume V and replica R, do not contain identical data. Eventually, the memories allocated to blocks n will contain identical data when replica R when, for example, synchronous writes generated by primary node 32 complete at the secondary node 42. When block n data of replica R is identical to block n data of volume V, the process proceeds to step 116 where primary node 32 allocates new memory to store block n data of volume V. Thereafter, in step 120, primary node implements a process for copying the data contents from memory allocated to store block n of replica R to new memory allocated to block n of volume V. Once step 120 is performed, IO transactions to read data from block n of volume V can complete without having to go through the lengthy process described in the background section above. It is noted that if memory allocated to block n contains corrupted data rather than inaccessible data, this can be corrected using the process shown in FIG. 9 without step 116 and replacing step 120 with the step of copying data from memory allocated to store block n of replica R to memory allocated to store block n of volume V.

Figure 10:
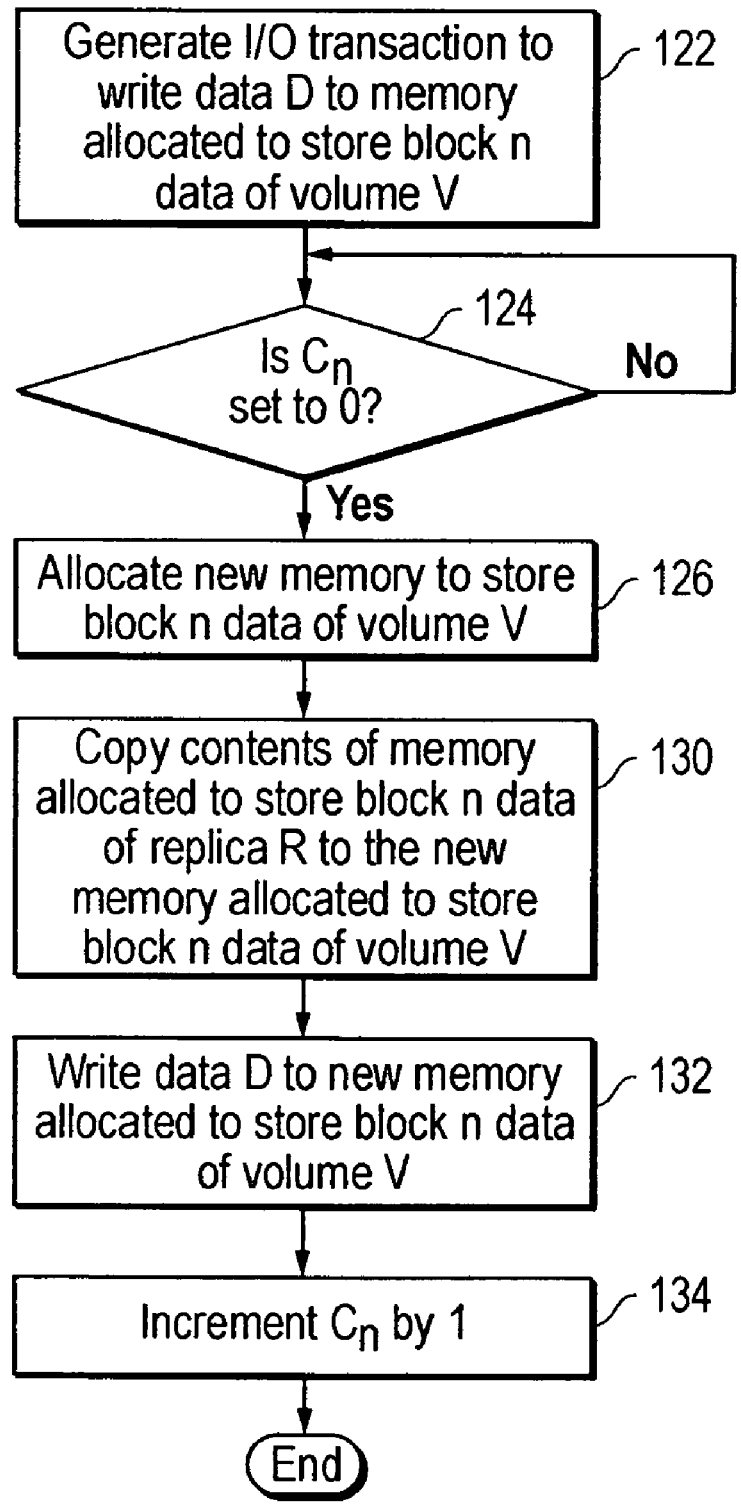
FIG. 10 illustrates relevant operational aspects of a replica R to correct data corruption or inaccessibility in a volume V during an IO transaction to write data.

FIG. 10 illustrates relevant operational aspects of correcting an instance in which data cannot be written to volume V as a result of hardware error that precludes access to allocated memory. The process shown in FIG. 10 begins with step 122 where primary node 32 generates an IO transaction to write data D to memory allocated to store block n data of volume V. Like the process shown in FIG. 9, if memory allocated to store block n data is inaccessible as a result of hardware failure, primary node 32 accesses redirection map 76 to determine the value of counter $C_n$ therein. If $C_n$ is set to a value other than 0, memories allocated to store data of respective blocks n of volume V and replica R, lack identical data. Primary node 32 can simply delay further processing until blocks n of volume V and replica R are synchronized. Once synchronization occurs, or if $C_n$ is initially set to 0, the process proceeds to step 126 where primary node allocates new memory to store block n data of volume V. In step 130, primary node copies the data in memory allocated to block n of replica R to the new memory allocated to block n of volume V. Thereafter, primary node 32 writes data D to the new memory allocated to block n of volume V according to the IO transaction of step 122. Lastly, primary node 32 increments $C_n$ by 1 thereby indicating that blocks n of volume V and replica R are no longer synchronized. FIG. 6 illustrates the redirection map 76 shown in FIG. 5 after implementing the process shown in FIG. 10 with respect to block 2 of volume V.

The process described with reference to FIGS. 9 and 10 presume that replica R is maintained using asynchronous replication. The same process works for synchronous replication. In synchronous replication $C_n$ will always be 1 and hence step 114 and 124 always result in execution of 116 and 126 respectively. Replica R may be maintained as a real time or near real time copy of volume V using periodic replication. U.S. Pat. No. 7,191,229 entitled "Method and System of Providing Periodic Replication," incorporated herein by reference in its entirety, describes relevant aspects of periodic replication. This application describes use of current data volume maps and next data volume maps to track differences between blocks of data volume V and its replica R. The current and next data volume maps can be used to create a redirection map for tracking differences between respective blocks in volume V and replica R. More particularly, a replication map can be formed as a multi-entry map wherein each entry corresponds to a logical OR of respective bits within the current and next data volume map. Each bit in this redirection map determines whether respective blocks within volume V and replica R are synchronized. This redirection map for periodic replication can be used instead of replication map 76 in processes described in FIGS. 7 and 8 to correct or overcome data corruption or data inaccessibility in volume V.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    creating a point-in-time (PIT) copy of a data volume, wherein the data volume comprises a plurality of data blocks including a first data block;
    creating a map in memory, wherein the map comprises a plurality of entries, wherein each entry of the map indicates whether memories allocated to store data of respective data blocks of the data volume and the PIT copy, contain identical data;

generating an I/O transaction to read data from or write data to memory allocated to store data of the first data block of the data volume;
if an entry in the map indicates that identical data is stored in memories allocated to the first data block of the data volume and a first block of the PIT copy, respectively:
reading data from memory allocated to store data of the first block of the PIT copy; and
allowing I/O transactions to complete using the data read from memory allocated to store data of the first block of the PIT copy, without first accessing a transaction log associated with the data volume.

2. The method of claim 1 wherein the data is read from memory allocated to the first block of the PIT if data cannot be written to or read from memory allocated to the first data block of the data volume.

3. The method of claim 1 wherein when the PIT is first created each entry of the map indicates that memories allocated to respective data blocks of the PIT copy initially contain data identical to data stored in respective memories allocated to respective data blocks of the data volume.

4. A method comprising:
creating a point-in-time (PIT) copy of a data volume, wherein the data volume comprises a plurality of data blocks including a first data block, wherein the PIT copy is initially created as a virtual copy of the data volume;
creating a map in memory, wherein the map comprises a plurality of entries, wherein each entry of the map indicates whether memories allocated to store data of respective data blocks of the data volume and the PIT copy, contain identical data, wherein each entry of the map initially indicates that memories allocated to respective data blocks of the data volume and the PIT copy, do not contain identical data;
generating an I/O transaction to read data from or write data to memory allocated to store data of the first data block of the data volume;
reading data from memory allocated to store data of a first block of the PIT copy if an entry in the map indicates that identical data is stored in memories allocated to the first data block of the data volume and the first data block of the PIT copy, respectively.

5. The method of claim 1 further comprising:
allocating new memory to store data of the first data block of the data volume;
copying data from memory allocated to the first data block of the PIT copy to the allocated new memory.

6. The method of claim 5 further comprising:
modifying data copied to the allocated new memory;
modifying the entry to indicate that memories allocated to store data of respective first data blocks of the data volume and the PIT copy, do not contain identical data.

7. The method of claim 4 further comprising:
copying data from memory allocated to data block n of the data volume to memory allocated to store data of a corresponding data block n of the PIT copy;
modifying one entry of the map to indicate that memories allocated to data block n of the data volume and to the corresponding data block n of the PIT copy, store identical data.

8. A method comprising:
creating a point-in-time (PIT) copy of a data volume, wherein the data volume comprises a plurality of data blocks including a first data block;
creating a map in memory, wherein the map comprises a plurality of entries, wherein each entry of the map indicates whether memories allocated to store data of respective data blocks of the data volume and the PIT copy, contain identical data;
generating an I/O transaction to read data from or write data to memory allocated to store data of the first data block of the data volume;
reading data from memory allocated to store data of a first block of the PIT copy if an entry in the map indicates that identical data is stored in memories allocated to the first data block of the data volume and the first data block of the PIT copy, respectively;
writing data to memory allocated to store a second data block of the PIT copy;
modifying an entry in the map to indicate that memories allocated to store data of respective second data blocks of the data volume and the PIT copy, do not contain identical data.

9. The method of claim 8 further comprising copying data from memory allocated to store data of the second data block of the data volume to memory allocated to store data of the second data block of the PIT copy before data is written to memory allocated to store the second data block of the PIT copy.

10. A method comprising:
creating a replica of a data volume, wherein the data volume comprises a plurality of data blocks including a first data block;
creating a map in memory, wherein the map comprises a plurality of entries, wherein each entry of the map indicates whether memories allocated to store data of respective data blocks of the data volume and the replica, contain identical data;
generating an I/O transaction to read data from or write data to memory allocated to store data of the first data block of the data volume;
if an entry in the map indicates that identical data is stored in memories allocated to the first data block of the data volume and a first block of the replica, respectively:
reading data from memory allocated to store data of the first block of the replica; and
allowing I/O transactions to complete using the data read from memory allocated to store data of the first block of the replica, without first accessing a transaction log associated with the data volume.

11. An apparatus comprising:
means for creating a data volume, wherein the data volume comprises a plurality of data blocks including a first data block;
means for creating a point-in-time (PIT) copy of the data volume;
means for creating a map in memory, wherein the map comprises a plurality of entries, wherein each entry of the map indicates whether memories allocated to store data of respective data blocks of the data volume and the PIT copy, contain identical data;
means for generating an I/O transaction to read data from or write data to memory allocated to store data of the first data block of the data volume;
means allowing I/O transactions to complete using data read from memory allocated to store data of a first block of the PIT copy without first accessing a transaction log associated with the data volume, if an entry in the map indicates that identical data is stored in memories allocated to the first data block of the data volume and the first data block of the PIT copy, respectively.

12. An apparatus comprising:
a computer system coupled to memory for storing data, wherein the computer system comprises a memory for storing instructions executable by the computer system, wherein the computer system implements a method in response to executing the stored instructions, the method comprising:
creating a point-in-time (PIT) copy of a data volume, wherein the data volume comprises a plurality of data blocks including a first data block;
creating a map in memory, wherein the map comprises a plurality of entries, wherein each entry of the map indicates whether memories allocated to store data of respective data blocks of the data volume and the PIT copy, contain identical data;
generating an I/O transaction to read data from or write data to memory allocated to store data of the first data block of the data volume;
if an entry in the map indicates that identical data is stored in memories allocated to the first data block of the data volume and a first block of the PIT copy, respectively:
reading data from memory allocated to store data of the first block of the PIT copy; and
allowing I/O transactions to complete using the data read from memory allocated to store data of the first block of the PIT copy, without first accessing a transaction log associated with the data volume.

13. A computer readable medium storing instructions executable by a computer system, wherein the computer system implements a method in response to executing the stored instructions, the method comprising:
creating a point-in-time (PIT) copy of a data volume, wherein the data volume comprises a plurality of data blocks including a first data block;
creating a map in memory, wherein the map comprises a plurality of entries, wherein each entry of the map indicates whether memories allocated to store data of respective data blocks of the data volume and the PIT copy, contain identical data;
generating an I/O transaction to read data from or write data to memory allocated to store data of the first data block of the data volume;
if an entry in the map indicates that identical data is stored in memories allocated to the first data block of the data volume and a first block of the PIT copy, respectively:
reading data from memory allocated to store data of the first block of the PIT copy; and
allowing I/O transactions to complete using the data read from memory allocated to store data of the first block of the PIT copy, without first accessing a transaction log associated with the data volume.

14. The computer readable medium of claim 13 wherein the data is read from memory allocated to the first block of the PIT if data cannot be written to or read from memory allocated to the first data block of the data volume.

15. The computer readable medium of claim 13 wherein when the PIT is first created, memories allocated to respective data blocks of the PIT copy initially contain data identical to that stored in respective memories allocated to respective data blocks of the data volume.

16. A computer readable medium storing instructions executable by a computer system, wherein the computer system implements a method in response to executing the stored instructions, the method comprising:
creating a point-in-time (PIT) copy of a data volume, wherein the data volume comprises a plurality of data blocks including a first data block, wherein the PIT copy is initially created as a virtual copy of the data volume;
creating a map in memory, wherein the map comprises a plurality of entries, wherein each entry of the map indicates whether memories allocated to store data of respective data blocks of the data volume and the PIT copy, contain identical data, wherein each entry of the map initially indicates that memories allocated to respective data blocks of the data volume and the PIT copy, do not contain identical data;
generating an I/O transaction to read data from or write data to memory allocated to store data of the first data block of the data volume;
if an entry in the map indicates that identical data is stored in memories allocated to the first data block of the data volume and to a first data block of the PIT copy, respectively, reading data from memory allocated to store data of the first block of the PIT copy after generation of the I/O transaction.

17. The computer readable medium of claim 13 wherein the method further comprises:
allocating new memory to store data of the first data block of the data volume;
copying data from memory allocated to the first data block of the PIT copy to the allocated new memory.

18. The computer readable medium of claim 17 wherein the method further comprises:
modifying data copied to the allocated new memory;
modifying the entry to indicate that memories allocated to store data of respective first data blocks of the data volume and the PIT copy, do not contain identical data.

19. The computer readable medium of claim 16 wherein the method further comprises:
copying data from memory allocated to data block n of the data volume to memory allocated to store data of a corresponding data block n of the PIT copy;
modifying one entry of the map to indicate that memories allocated to data block n of the data volume and to the corresponding data block n of the PIT copy, do not store identical data.

20. A computer readable medium storing instructions executable by a computer system, wherein the computer system implements a method in response to executing the stored instructions, the method comprising:
creating a replica of a data volume, wherein the data volume comprises a plurality of data blocks including a first data block;
creating a map in memory, wherein the map comprises a plurality of entries, wherein each entry of the map indicates whether memories allocated to store data of respective data blocks of the data volume and the replica, contain identical data;
generating an I/O transaction to read data from or write data to memory allocated to store data of the first data block of the data volume;
if an entry in the map indicates that identical data is stored in memories allocated to the first data block of the data volume and the first block of the replica, respectively:
reading data from memory allocated to store data of the first block of the replica; and
allowing I/O transactions to complete using the data read from memory allocated to store data of the first block of the replica, without first accessing a transaction log associated with the data volume if an entry in the map indicates that identical data is stored in memories allocated to the first data block of the data volume and the first data block of the replica, respectively.

21. An apparatus comprising:

a first computer system coupled to a first memory for storing a data volume and a second memory for storing a replica of the data volume, wherein the first computer system comprises a memory for storing instructions executable by the first computer system, wherein the first computer system implements a method in response to executing the instructions, the method comprising:

creating the data volume in the first memory, wherein the data volume comprises a plurality of data blocks including a first data block;

creating the replica of the data volume in the second memory;

creating a map in memory, wherein the map comprises a plurality of entries, wherein each entry of the map indicates whether memory portions allocated to store data of respective data blocks of the data volume and the replica, contain identical data;

generating an I/O transaction to read data from or write data to a memory portion allocated to store data of the first data block of the data volume;

if an entry in the map indicates that identical data is stored in memory portions allocated to the first data block of the data volume and a first block of the replica, respectively:

reading data from a memory portion allocated to store data of the first block of the replica; and allowing I/O transactions to complete using the data read from the memory portion allocated to store data of the first block of the replica, without first accessing a transaction log associated with the data volume.

* * * * *